US012629827B2

(12) United States Patent　(10) Patent No.:　US 12,629,827 B2
Wheaton et al.　(45) Date of Patent:　May 19, 2026

(54) RAPID CHANGE MECHANISM FOR COMPLEX END EFFECTORS

(71) Applicant: The Boeing Company, Chicago, IL (US)

(72) Inventors: Christopher J. Wheaton, Mukilteo, WA (US); Clayton Munk, Rockland, ID (US); Brian R. Conlan, Seattle, WA (US); Gavin Lloyd Smith, Edmonds, WA (US); Dan D. Day, Seattle, WA (US); Johannes Meyling, Clinton, WA (US)

(73) Assignee: The Boeing Company, Arlington, VA (US)

( * ) Notice: Subject to any disclaimer, the term of this patent is extended or adjusted under 35 U.S.C. 154(b) by 760 days.

(21) Appl. No.: 17/743,709

(22) Filed: May 13, 2022

(65) Prior Publication Data

US 2022/0362931 A1　Nov. 17, 2022

Related U.S. Application Data

(60) Provisional application No. 63/188,663, filed on May 14, 2021.

(51) Int. Cl.
　　*B25J 9/16*　　　(2006.01)
　　*B25J 15/04*　　　(2006.01)
(52) U.S. Cl.
　　CPC ........... *B25J 9/1653* (2013.01); *B25J 9/1692* (2013.01); *B25J 15/0483* (2013.01)

(58) Field of Classification Search
　　CPC .... B25J 9/1653; B25J 9/1692; B25J 15/0483; B25J 9/1612; G05B 2219/39024;
　　　　　　(Continued)

(56) References Cited

U.S. PATENT DOCUMENTS 6,681,145 B1 *　1/2004　Greenwood ........... B25J 9/1692
　　　　　　　　　　　　　　　700/193
8,608,773 B2 *　12/2013　Tierney .................. G06Q 30/02
　　　　　　　　　　　　　　　606/205

(Continued)

FOREIGN PATENT DOCUMENTS

EP　　　　3135443 A1　　3/2017
EP　　　　1637946 A1　　12/2018
　　　　　　(Continued)

OTHER PUBLICATIONS

Extended European Search Report for European Patent Application No. 22169749.3 mailed on Oct. 5, 2022, 13 pages.
(Continued)

*Primary Examiner* — Sihar A Karwan
(74) *Attorney, Agent, or Firm* — Walters & Wasylyna LLC

(57)　　　　　　　ABSTRACT

Technology identifies that an end effector is provisioned to a robot. The technology accesses identification data of the end effector. The identification data is specific to the end effector. The identification data includes one or more of at least one setting associated with the end effector or at least one parameter associated with the end effector. The technology controls the end effector based on the identification data to adjust one or more runtime parameters of the robot based on the identification data.

20 Claims, 12 Drawing Sheets

(58) Field of Classification Search
CPC ........... G05B 2219/39468; G05B 2219/49305;
G05B 2219/49303
See application file for complete search history.

(56) References Cited

U.S. PATENT DOCUMENTS

| | | | |
|---|---|---|---|
| 2010/0180711 A1* | 7/2010 | Kilibarda ............. | B25J 15/0483 |
| | | | 219/136 |
| 2017/0057085 A1* | 3/2017 | Cookson .............. | B25J 15/0408 |
| 2018/0257221 A1* | 9/2018 | Toothaker .............. | B25J 9/1612 |
| 2018/0264653 A1* | 9/2018 | Fadlovich et al. ... | B25J 15/0019 |

FOREIGN PATENT DOCUMENTS

| | | | | |
|---|---|---|---|---|
| JP | 2002036155 A1 | 2/2002 | | |
| WO | WO-2009095350 A1 * | 8/2009 | ......... | G05B 19/4083 |
| WO | WO-2021132107 A1 * | 7/2021 | .............. | B25J 15/04 |

OTHER PUBLICATIONS

Communication Pursuant to Article 94(3) EPC, EP Application No. 22169749.3, Dated Sep. 3, 2024. Eleven Pages.

* cited by examiner

500

RAPID CHANGE MECHANISM FOR COMPLEX END EFFECTORS

CROSS REFERENCE TO RELATED APPLICATIONS

This U.S. Non-Provisional patent application claims benefit of priority to U.S. Provisional Patent Application No. 63/188,663 filed May 14, 2021.

TECHNICAL FIELD

Examples relate to a modular processing system that comprises a robot and an end effector that includes identification data specific to the end effector. When the robot receives the end effector, the robot reads the identification data to reduce latency of and/or bypass aspects of a configuration process associated the end effector.

BACKGROUND

A robot (e.g., a 6-axis articulated arm robot or post milling robot) and an end effector can be qualified as a pair. For example, a robot receives an end effector on an arm of the end effector to execute a particular task and/or operation. In order to be qualified as a pair, the robot and the end effector undergo a complex qualification process (e.g., a configuration process that includes validation of the end effector). The qualification process is extensive in some cases, and only some types of end effectors are operable with a particular robot leading to significant delays and burdensome processes to qualify a new robot and end effector pair.

For example, end effectors are used in many different contexts and are produced by numerous manufacturers. As a consequence, end effectors have significant variations in characteristics, such as size, sensors, usage, weight (e.g., ranging from less than a one pound to several hundred pounds), tools, etc. Such variations are identified for accuracy during production.

In more detail, a robotic arm (e.g., "part A") has small compensation offsets, and an end effector (e.g., "part B") also has small compensation offsets. The offsets to be compensated are a result of the robotic arm and the end effector being mechanically imperfect due to fabrication, assembly, and/or wear. Compensation factors reside independently in each part. When the parts are mated together, the compensation factors are combined. This allows the robotic arm and the end effector to be qualified together for usage, but also be separated and brought back together and remain qualified for use. Compensation factors are adjusted through software. For some robotics/end effector assemblies, the robotic arm and end effector are compensated and/or qualified as a single entity. In doing so, replacement of an end effector would require the entire end effector and robotic arm assembly be recompensated to meet qualification and/or calibration requirements.

In a first implementation, the robot executes a configuration process (e.g., a qualification process) to identify the particular characteristics of the end effector to effectively utilize the end effector. The configuration process consumes a significant amount of time (e.g., months) and resources to complete. For example, the configuration process includes removing the robot from a production line to reconfigure the robot to operate with the end effector, causing the production line to either be inoperative for a period of time or requiring the insertion of another robot into the production line. After the robot is reconfigured, the robot is re-inserted into the production line.

A second implementation includes leaving the robot in place on the production line to reconfigure the robot with the new end effector. Doing so leaves the production line inoperative during the configuration process, which as noted above could require a lengthy period of time to complete. In either the first or second implementation, the overall process is costly in terms of time, resources and human oversight.

SUMMARY

In accordance with one or more examples, a modular processing system comprises an end effector that includes a storage device, where the storage device includes identification data that is specific to the end effector, further where the identification data includes one or more of at least one setting associated with the end effector or at least one parameter associated with the end effector. The modular processing system includes a robot that receives the end effector, at least one processor, and at least one memory coupled to the at least one processor, the at least one memory including a set of instructions. The set of instructions, which when executed by the at least one processor, causes the system to identify the identification data of the end effector and adjust one or more runtime parameters of the system based on the identification data.

In accordance with one or more examples, an end effector comprising at least one processor, and at least one memory coupled to the at least one processor, the at least one memory including a set of instructions. The set of instructions when executed by the at least one processor, causes the end effector to identify when the end effector is provisioned to a robot, and present identification data to the robot, wherein the identification data is specific to the end effector, wherein the identification data includes one or more of at least one setting associated with the end effector or at least one parameter associated with the end effector.

In accordance with one or more examples, a robot comprising an effector arm to releasably receive an end effector, where the end effector stores identification data including one or more of at least one setting associated with the end effector or at least one parameter associated with the end effector, at least one processor, and at least one memory coupled to the at least one processor. The at least one memory including a set of instructions, which when executed by the at least one processor, causes the robot to identify the identification data of the end effector, and adjust one or more runtime parameters of the robot based on the identification data.

In accordance with one or more examples, a robot comprising an effector arm to releasably a method comprises identifying that an end effector is provisioned to a robot, accessing identification data of the end effector, wherein the identification data is specific to the end effector, wherein the identification data includes one or more of at least one setting associated with the end effector or at least one parameter associated with the end effector, and controlling the end effector based on the identification data to adjust one or more runtime parameters of the robot based on the identification data.

BRIEF DESCRIPTION OF THE DRAWINGS

The various advantages of the examples will become apparent to one skilled in the art by reading the following specification and appended claims, and by referencing the following drawings, in which:

DETAILED DESCRIPTION

Some examples relate to an enhanced provisioning, qualification and configuration process facilitated by the components described below by storing identification data (which is generated by a previous qualification process) within the end effector itself to reduce disruptions in robot productivity and reduce, if not altogether eliminate, the configuration process the robot must execute to utilize the end effector. The enhanced process enables a modular processing system to change an end effector in an effective and efficient manner with reduced "down-time." For example, rather than undergoing a complex qualification process over a lengthy time period (e.g., a few months), a new end effector and robot pair executes a qualification process that completes in a substantially reduced period of time (e.g., a few minutes). Moreover, the robot is operable with multiple types of end effectors (e.g., is not constrained to only working with certain types of end effectors) since the robot determines data and information from the end effector to effectively utilize the end effector. In contrast, other implementations of robots are only operable with certain end effectors with compatible hardware (e.g., a certain number of sensors and types of sensors). Thus, the modular processing system is able to be retooled in an effective and efficient manner and as a consequence is more agile, robust and efficient.

Figure 1:
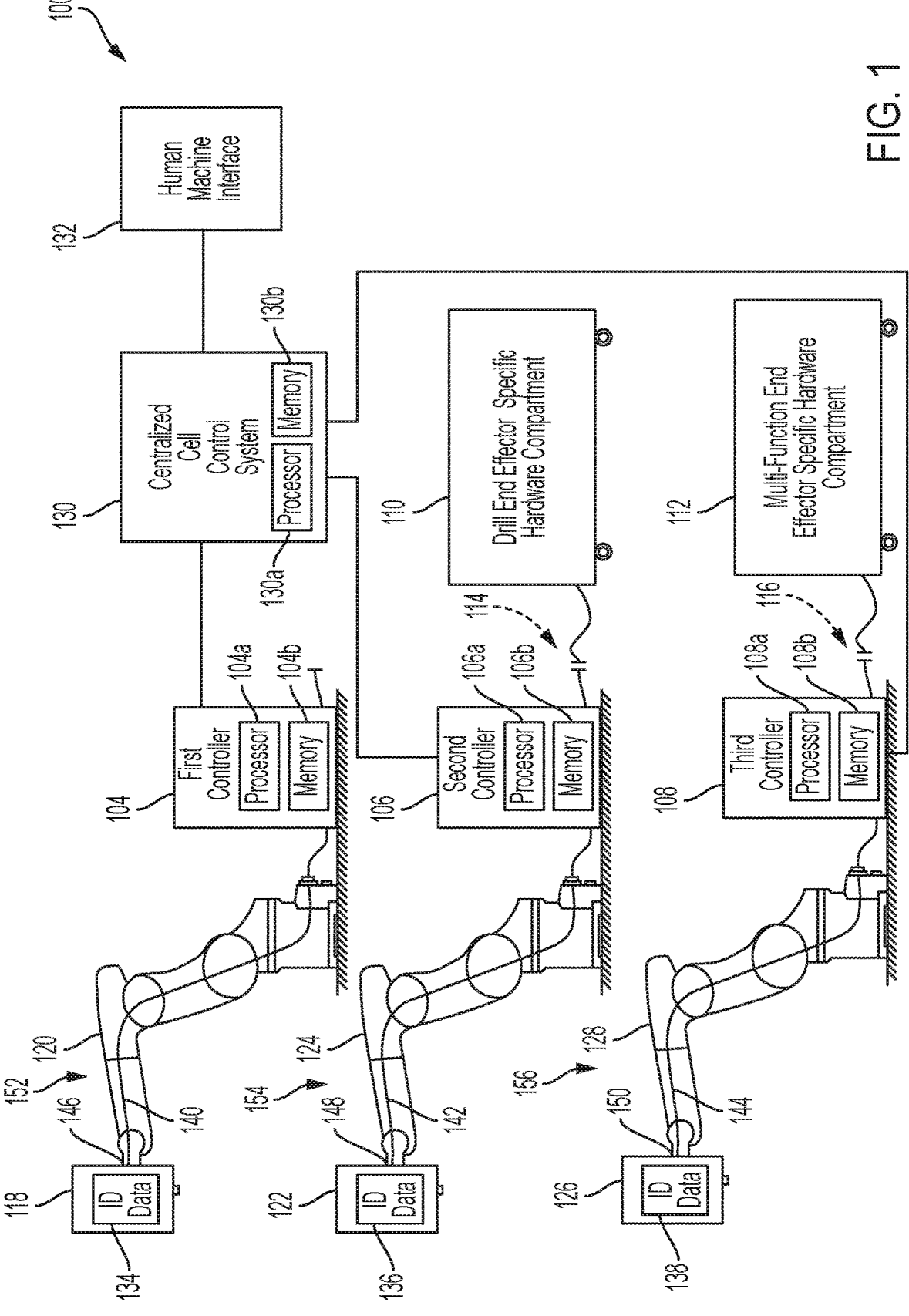
FIG. 1 is an automation cell that includes modular processing systems according to an example.

In detail, FIG. 1 illustrates an automation cell 100 (e.g., aerospace automation cell). The automation cell 100 includes first, second and third modular processing systems 152, 154, 156. The first modular processing system 152 includes a first robot 120 coupled with a first end effector 118. The first end effector 118 is a multi-function end effector (MFEE) that includes identification (ID) data 134 (e.g., identity, settings and parameters) stored in a storage device and/or space (e.g., non-volatile memory) of the first end effector 118. An MFEE combines multiple functions (e.g., drilling, filling, fastening, moving objects, etc.) into a single end effector. The first end effector 118 is setup (e.g., maintained, calibrated, qualified) offline to determine identity, parameters and/or settings of the first end effector 118. The first end effector 118 internally stores the identity, parameters and/or settings as the ID data 134. The first end effector 118 is quickly introduced into a production automation cell with limited setup since the setup is executed offline, stored within the ID data 134, and then accessed to accurately utilize the first end effector 118.

The first end effector 118 includes a control structure that stores, records and/or maintain specifics of the first end effector 118. In this example, the control structure is the ID data 134. When presented to the first robot 120, the first end effector 118 presents the ID data 134 to the first robot 120. For example, the first robot 120 can directly access the ID data 134 or the first end effector 118 can provide the ID data 134 in response to a request from the first robot 120 and/or first controller 104.

A communication pathway 140 establishes a communication link between the first controller 104, the first robot 120 and the first end effector 118. The first robot 120 provides the ID data 134 to the first controller 104 through the communication pathway 140. The first controller 104 can be part of the first robot 120.

The first controller 104 receives the ID data 134 and adjust one or more runtime parameters of the first robot 120 based on the ID data 134. For example, the ID data 134 identifies hardware components of the first end effector 118. Examples of the hardware components include sensors of the first end effector 118, types of the sensors, a shape of the first end effector 118, a size of the first end effector 118, weight data of the first end effector 118, data associated with a motor of the first end effector 118, and/or movement data of the first end effector 118.

The ID data 134 is specific to the first end effector 118. For example, there are variations among end effectors that are all an identical type (e.g., a same model end effector). That is, even minute differences in size and shape (e.g., within several thousands of an inch) affect processing parameters associated with the end effectors. For example, if the first robot 120 issues a command to the first end effector 118 to move by one inch, and the first end effector 118 moves by marginally more (e.g., 1.01 inches), the first robot 120 must be made aware of such a deviation (e.g., movement data) to correct for the deviation via offsets in programming. Thus, the ID data 134 includes the actual distances the first end effector 118 moves when given an instruction to move, among other data points, to accurately move and control the first end effector 118. Such distances and the ID data 134, are precomputed ahead of time and prior to the first end effector 118 being received within the first robot 120.

Thus, in order to achieve positional accuracy and repeatability standards, the first robot 120 must identify the specific characteristics of the first end effector 118. The specific characteristics of the first end effector 118 are stored within the ID data 134 to achieve the positional accuracy and repeatability standards.

The specific factors of the first end effector 118 are stored internally within the first end effector 118 as ID data 134 to bypass conducting one or more aspects of a full calibration process at the first robot 120 and automation cell 100. For example, a full calibration process includes aspects such as measuring various physical (e.g., a tool center point, lengths of different portions, etc.), and electrical characteristics of the first end effector 118. Such aspects are executed offline and prior to the first end effector 118 being inserted into the first robot 120. The ID data 134 includes such measurements.

More particularly, due to tolerance build up (e.g., mechanical component variations), the ID data 134 can represent correlations between a vision system of the first robot 120 and a tool point center of the first end effector 118 to execute processes with extreme accuracy while bypassing execution of lengthy calibration and qualification cycles with the first robot 120. The first controller 104 shifts a coordinate system based on the correlations to keep track of the first end effector 118 instead of an end of an end effector arm of the first robot 120. For example, the first controller 104 controls movements and positioning of the first end effector 118 based on the correlations to execute processes. In more detail, stored data, that is part of the ID data 134, can include a first correlation between the vision system of the first robot 120 and the tool center point of the first end effector 118. The first correlation is different than stored data (which can be part of ID data of a second end effector) representing a second correlation between the vision system of the first robot 120 and a tool center point of the second end effector. Such differences are stored in the end effectors so that robots that receive and utilize the end effectors will each accurately perform functions (e.g., drill a hole in a correct location). Similar data can be stored for various functions that different end effectors will be employed to execute.

The first end effector 118 therefore carries its own identity and settings. The first end effector 118 is thus setup (e.g., maintained, calibrated, qualified) offline and prior to attachment to the first robot 120. The first end effector 118 is quickly introduced into the first robot 120 in a production automation cell with limited setup and bypassing at least part of (e.g., one or more aspects) of the calibration process being executed after insertion into the first robot 120. The first robot 120 thus quickly utilizes the first end effector 118 after the first end effector 118 is inserted into the first robot 120 as opposed to other implementations which need to execute a lengthy full calibration process during retooling.

The first robot 120 includes a repeatable, quick change mechanical interface 146 (e.g., part of an effector arm) of the first robot 120. The mechanical interface 146 is quickly adjustable to operate with different end effector types.

As already noted, the first controller 104 controls the first robot 120 and operates the first robot 120 based on the ID data 134. The first controller 104 can be an onboard control component such as a programmable logic controller (PLC). The first controller 104 maintains the settings of the first end effector 118. The first controller 104 communicates to the controls of the first robot 120, present and/or modify settings and parameters important to the first end effector 118. The first controller 104 can be part of the first robot 120.

The first controller 104 also records data and history needed for the first end effector 118 when released from the first robot 120. For example, the record data and history includes whether the first end effector 118 has changed in size, shape, orientation, motor changes, distance moved deviations, has received damage, etc. That is, the record data and history includes any factors relating to operation of the first end effector 118.

The first controller 104 updates the ID data 134 to include the record data and history. For example, the first controller 104 identifies that the ID data 134 is to be updated based on usage (e.g., changes to an operational condition) of the first end effector 118. The operational condition can be a hardware change (e.g., sensor broken, change in shape, size, weight, motor degradation, movement deviations, etc.) in the first end effector 118 that affects performance of the first end effector 118. Such operational conditions are recorded in the ID data 134 so that if the first end effector 118 is removed from the first robot 120, the first end effector 118 is able to be quickly retooled into another robot based on up-to date information and operational conditions of the first end effector 118 stored in the ID data 134. The ID data 134 is stored in a non-volatile memory of the first end effector 118 to survive across power cycles. Thus, the ID data 134 of the first end effector 118 includes up-to date information that reflects a current condition of the first end effector 118.

The first controller 104 updates the ID data 134 "on the fly," for example as changes to the first end effector 118 occur. In some examples, the first controller 104 updates the ID data 134 when the first end effector 118 is about to be removed from the first robot 120.

Thus, the first controller 104 transmits commands to the first robot 120 and receives data from the first robot 120. The data can be a completion of task, sensor readings, status updates, ID data 134, etc. The first controller 104 processes the data to correspondingly update the ID data 134 as appropriate and control the first robot 120. The first controller 104 is further connected to a centralized cell control system 130. The centralized cell control system 130 coordinates actions across the automation cell 100. A human machine interface 132 provides comments to the centralized cell control system 130 to control the automation cell 100. The centralized cell control system 130 includes safety systems, data storage, a network server (e.g., a Netcat based server) and other components.

The automation cell 100 also includes the second modular processing system 154 that includes a second robot 124 that is coupled to a second end effector 122 via a quick change mechanical interface 148. For the sake of brevity, similar components and processes as described above with respect to the first modular processing system 152 that are applicable to the second modular processing system 154 will not all be repeated herein. Similarly to as above, however, the second robot 124 and/or second controller 106 updates operating parameters based on the ID data 136, and update the ID data 136 based on operational conditions of the second end effector 122. The second controller 106 controls drilling operations of the second robot 124 via the communication path 142 and in response to an instruction received from the centralized cell control system 130.

The second end effector 122 is a drill only end effector. Thus, drill end effector specific hardware compartment 110 will be attached to the second controller 106 to provide drill specific features for the second end effector 122. The drill specific features include Non-Computerized Numerical Control (Non-CNC) controls lubrication, tool changer, etc. An attachment point 114 couples the second controller 106 to the drill end effector specific hardware compartment 110.

The automation cell 100 also includes the third modular processing system 156 that includes a third robot 128 that is coupled to a third end effector 126 via a quick change mechanical interface 150. For the sake of brevity, similar components and processes as described above with respect to the first modular processing system 152 that are applicable to the third modular processing system 156 will not all be repeated herein. Similarly to as above, the third robot 128 and/or third controller 108 updates operating parameters based on the ID data 138, and update the ID data 138 based on operational conditions of the third end effector 126. The third controller 108 controls multi-function operations of the third robot 128 via the communication path 144 and in response to an instruction received from the centralized cell control system 130.

The third end effector 126 is a multi-function end effector. The third end effector 126 can differ in function and operations from the first end effector 118, and require various tools. Thus, a multi-function end effector specific hardware compartment 112 will be attached to the third controller 108 to provide multi-function tools for the third end effector 126, such as lubrication, faster feed, sealant inspection, processing components, tool changer, etc. An attachment point 116 couples the third controller 108 to the multi-function end effector specific hardware compartment 112.

Thus, examples as described herein enable flexibility (e.g., ability to interchange a plurality of tools in an automation cell, allowing end effectors for specific work statements to be applied). For example, a general drill and fill end effector is able to be swapped for a more specialized special drilling end effector for drilling large holes.

Examples also simplify processes with the ability to swap end effectors easily and reliably. Doing so allows end effectors to be simplified to focus on more specific work statements. For example, a general drill and fill end effector that no longer needs a large spindle to drill a subset of holes is able to be swapped for a different general drill and fill end effector. In another example, an automation cell that bolts and rivets could have a separated bolting end effector and riveting end effector instead of a large, single, complex head that executes both functions.

Examples further reduce automation down time due to failures. For example, end effectors represent a large portion of the complexity in aerospace automation systems and thus a large portion of the failures and reliability issues. The ability to remove the end effector and maintain the end effector offline allows the automation cell to resume building product while the failed unit is repaired offline, thus improving uptime of the automation cell.

Examples further reduce automation down time due to equipment maintenance, calibration, and qualification. For example, nearly all automation systems require maintenance to be performed and the more proactive and robust the maintenance plan, the more reliable the assets tend to be. Additionally, aerospace automation systems often have calibration, certification, and qualification requirements. These elements all require the assets to be stopped, not producing product. This technology allows the critical elements of the end effector to be maintained, calibrated, certified, and qualified offline, thus improving the uptime of the automation cell.

The first controller 104 includes at least one processor 104a, and at least one memory 104b coupled to the at least one processor 104a, the at least one memory 104b including a set of instructions, which when executed by the at least one processor 104a, causes the first modular processing system 152 to implement the aspects described above. The location of the at least one processor 104a, and at least one memory 104b (e.g., non-volatile memory) may be modified to be within the first robot 120 and/or the end effector 118. Similarly, the second and third modular processing systems 154, 156 include at least one processor 106a, 108a and at least one memory 106b, 108b (e.g., non-volatile memory) which implement aspects described above. The location of the at least one processor 106a, 108a and at least one memory 106b, 108b (e.g., non-volatile memory) may be modified to be within the second or third robot 124, 128 respectively and/or the second and third end effector 122, 126 respectively.

The centralized cell control system 130 includes at least one processor 130a, and at least one memory 130b (e.g., non-volatile memory) coupled to the at least one processor 130a, the at least one memory 130b including a set of instructions, which when executed by the at least one processor 130a, causes the first modular processing system 152, the second modular processing system 154 and the third modular processing system 156 to implement the aspects described above.

Figure 2:
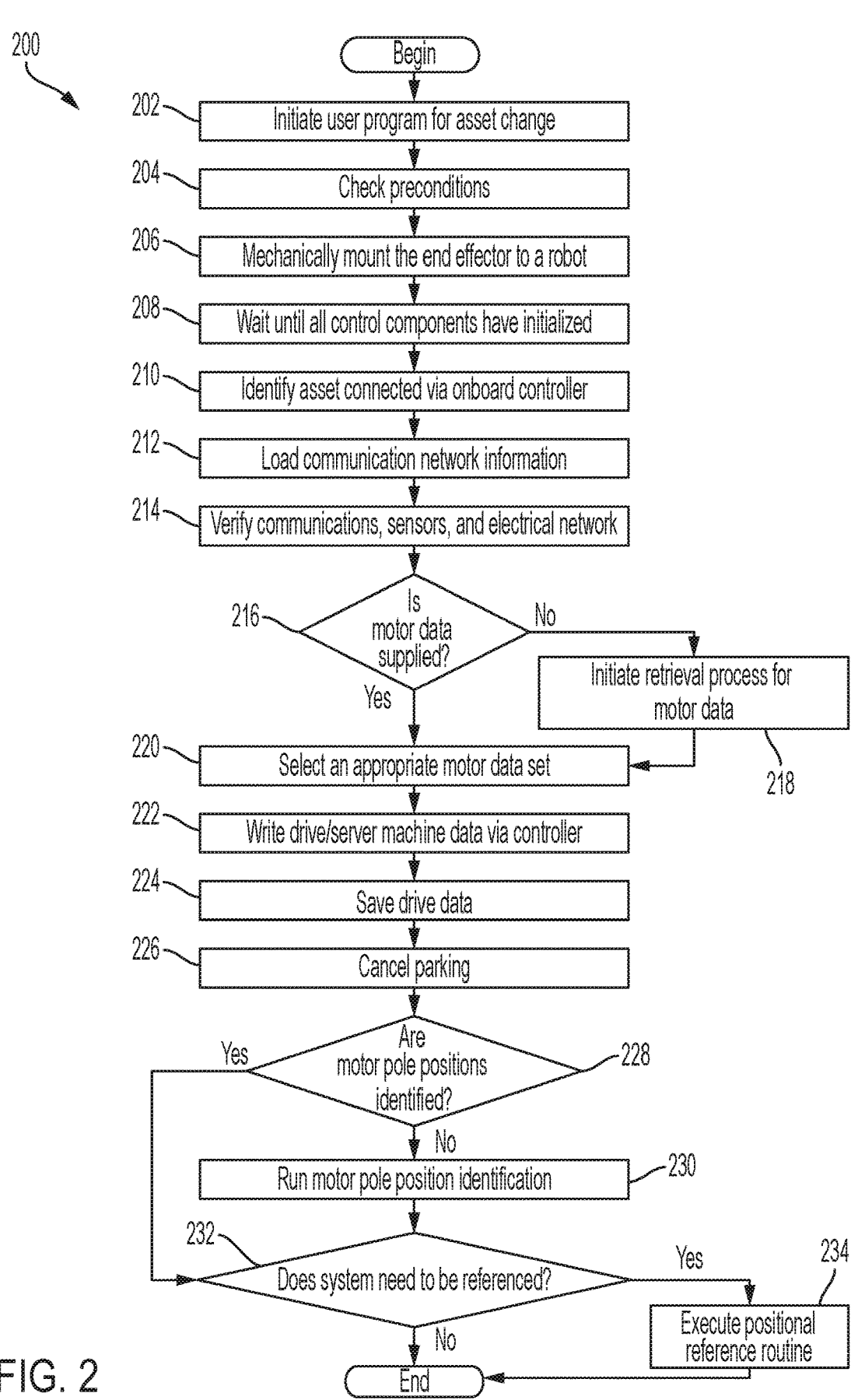
FIG. 2 is a flowchart of an example of a method of commissioning an end effector.

FIG. 2 illustrates a method 200 of commissioning an end effector. The end effector is provisioned to a robot, and is combinable with the example of automation cell 100 (FIG. 1). In an example, the method 200 is implemented in one or more modules as a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 202 initiates a user program for an asset change. Illustrated processing block 204 checks preconditions. Some examples of preconditions include whether the robot is compatible with the end effector and is able to support the end effector. Illustrated processing block 206 mechanically mounts the end effector to the robot. Illustrated processing block 208 waits until all control components have been initialized. The control components can include a controller. The controller can be a part of the robot or separate from the robot (e.g., a centralized controller). Illustrated processing block 210 identifies assets connected via an onboard controller (e.g., a PLC). The assets include the end effector, and in particular the ID information of the end effector. Illustrated processing block 212 loads communication network information. The communication network is able to be wired or wireless.

Illustrated processing block 214 verifies communications, sensors and an electrical network. The communications, sensors and the electrical network are at least partially embedded in the end effector. Illustrated processing block 216 determines if motor data (e.g., type of motor) is supplied as part of the identification data. If not, illustrated processing block 218 initiates a retrieval process for motor data. For example, the retrieval process includes an XML script to retrieve the motor data. Illustrated processing block 220 selects an appropriate motor data set for the motor. The motor data set includes commands, parameters, etc.

Illustrated processing block 222 writes drive/server (e.g., Netcat based) machine data via the controller (e.g., a PLC). Illustrated processing block 224 saves drive data (e.g., the motor data set). Illustrated processing block 226 cancels parking. Illustrated processing block 228 determines if motor pole positions are identified. For example, the motor can be a permanent-magnet stepper motor. A pole count is a number of pole pairs or stator windings. Increasing the number of pole pairs on the rotor itself (or adding more stator phases) increases resolution of the motor (e.g., how finely the motor is able to be controlled). If not, illustrated processing block 230 runs motor pole position identification. If the motor pole positions are identified, illustrated processing block 232 determines if the system needs to be referenced. If so illustrated processing block 234 executes a positional reference routine. If not, the method 200 completes.

Figure 3:
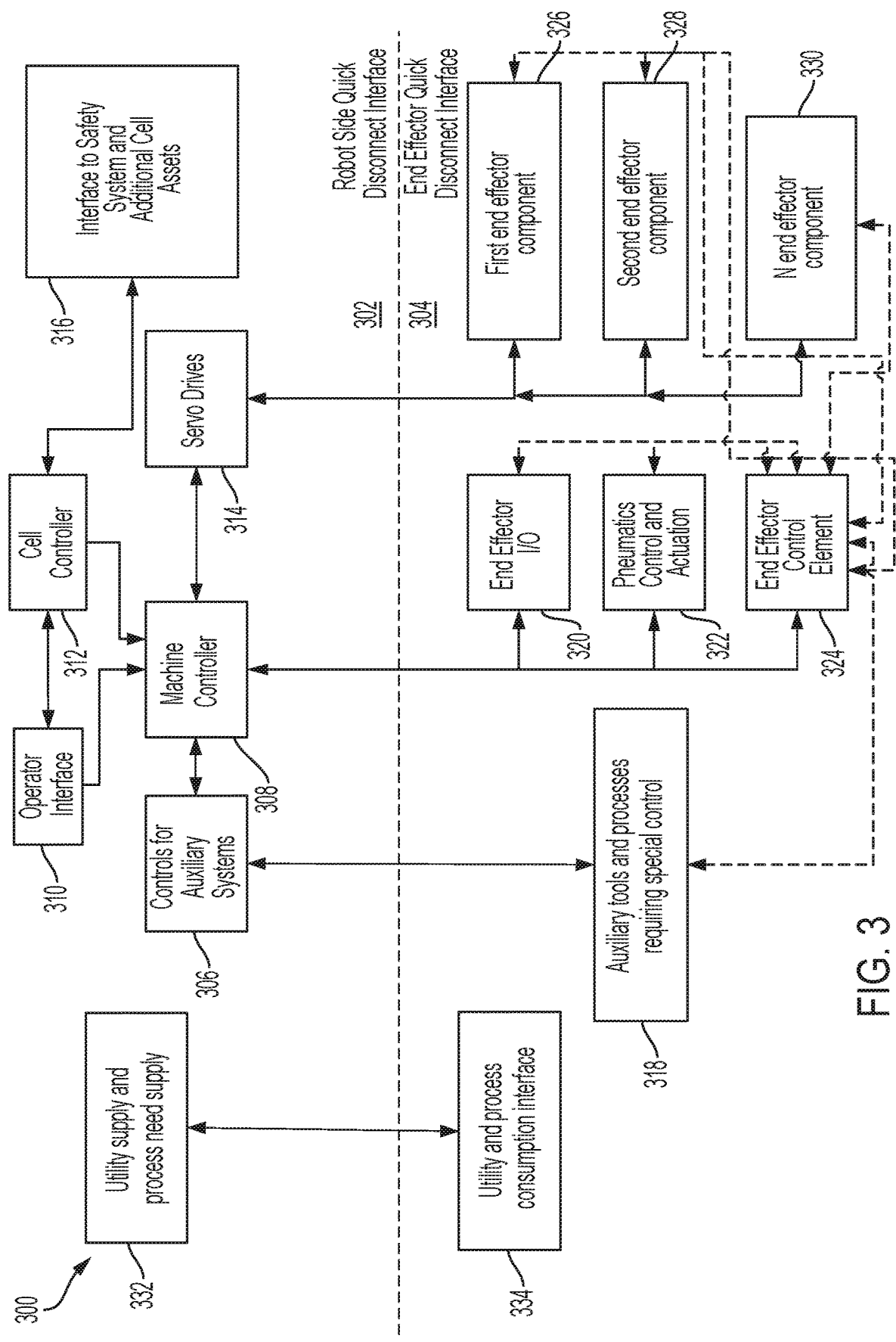
FIG. 3 is a modular processing system according to an example.

Turning now to FIG. 3, a modular processing system 300 is a physical implementation of a robot and an end effector and interactions therebetween. The modular processing system 300 is combinable with the example of automation cell 100 (FIG. 1) and/or method 200 (FIG. 2).

The modular processing system 300 includes a robot side robot side quick disconnect interface 302 and an end effector quick disconnect interface 304. The robot includes a utility supply (e.g., power and air) and process need supply (e.g., coolant, lube, fasteners, sealant, etc.) 332. The end effector includes a utility and process consumption interface 334.

The end effector includes auxiliary tools and processes (e.g., vision systems) requiring special controls 318. The robot correspondingly includes controls for auxiliary systems (e.g., vision systems) 306.

The robot includes a machine controller 308. The location of the machine controller 308 can be static. Several components, including an operator interface 310 (e.g., a display that includes a graphical-user interface to receive commands from a user), a cell controller 312, the controls for the auxiliary systems 306, and servo drives 314, connect to the machine controller 308. The machine controller 308 controls the components and/or receive commands from the components for execution. A location of the servo drives 314 can be static. The robot includes an interface to safety system and additional cell assets 316 (e.g., other machines, support equipment such as tool changers, etc.) that is connected with and controlled by the cell controller 312.

Figure 4A:
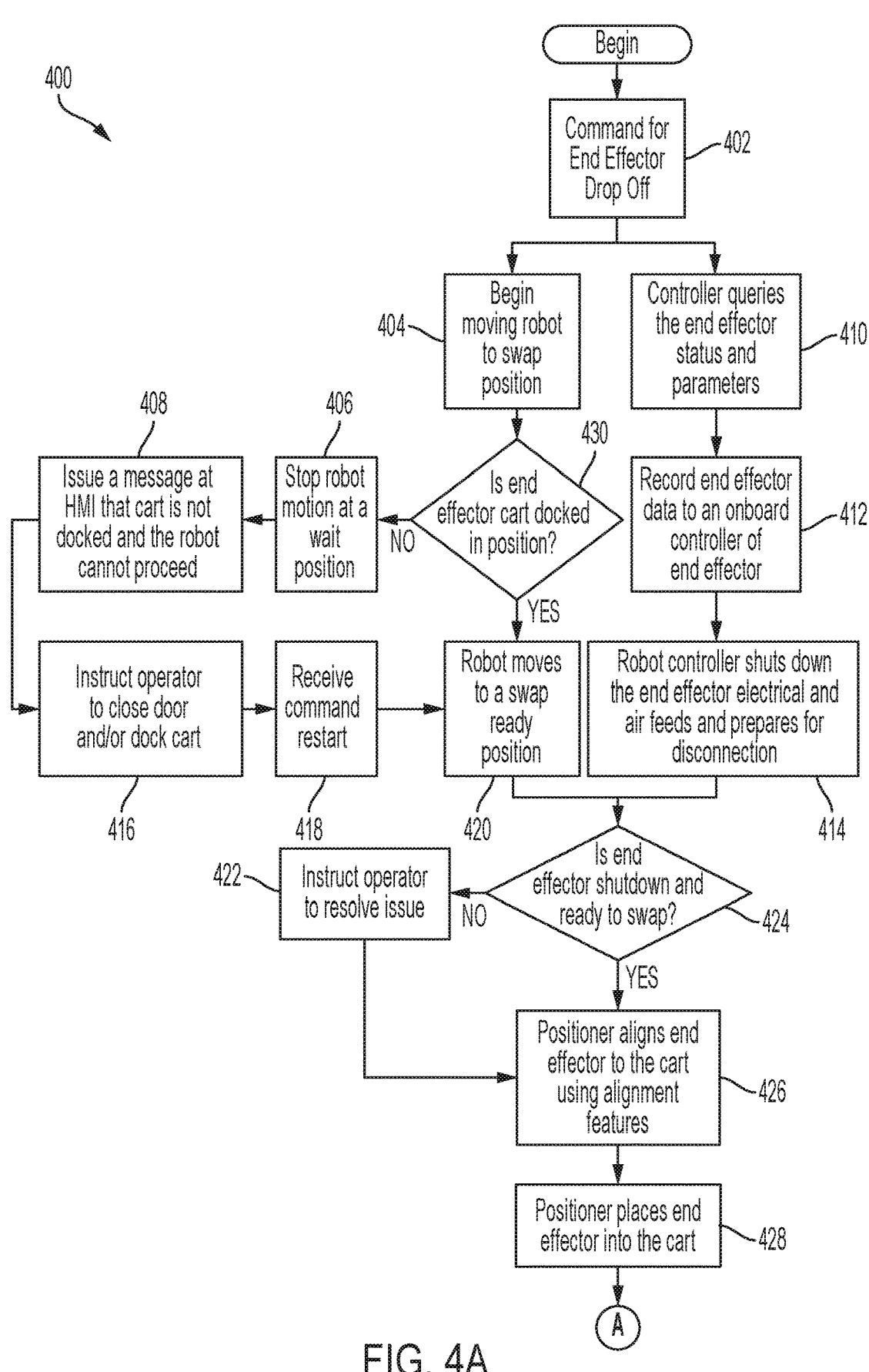
FIGS. 4A and 4B are a flowchart of an example of a method of decommissioning an end effector.
Figure 4B:
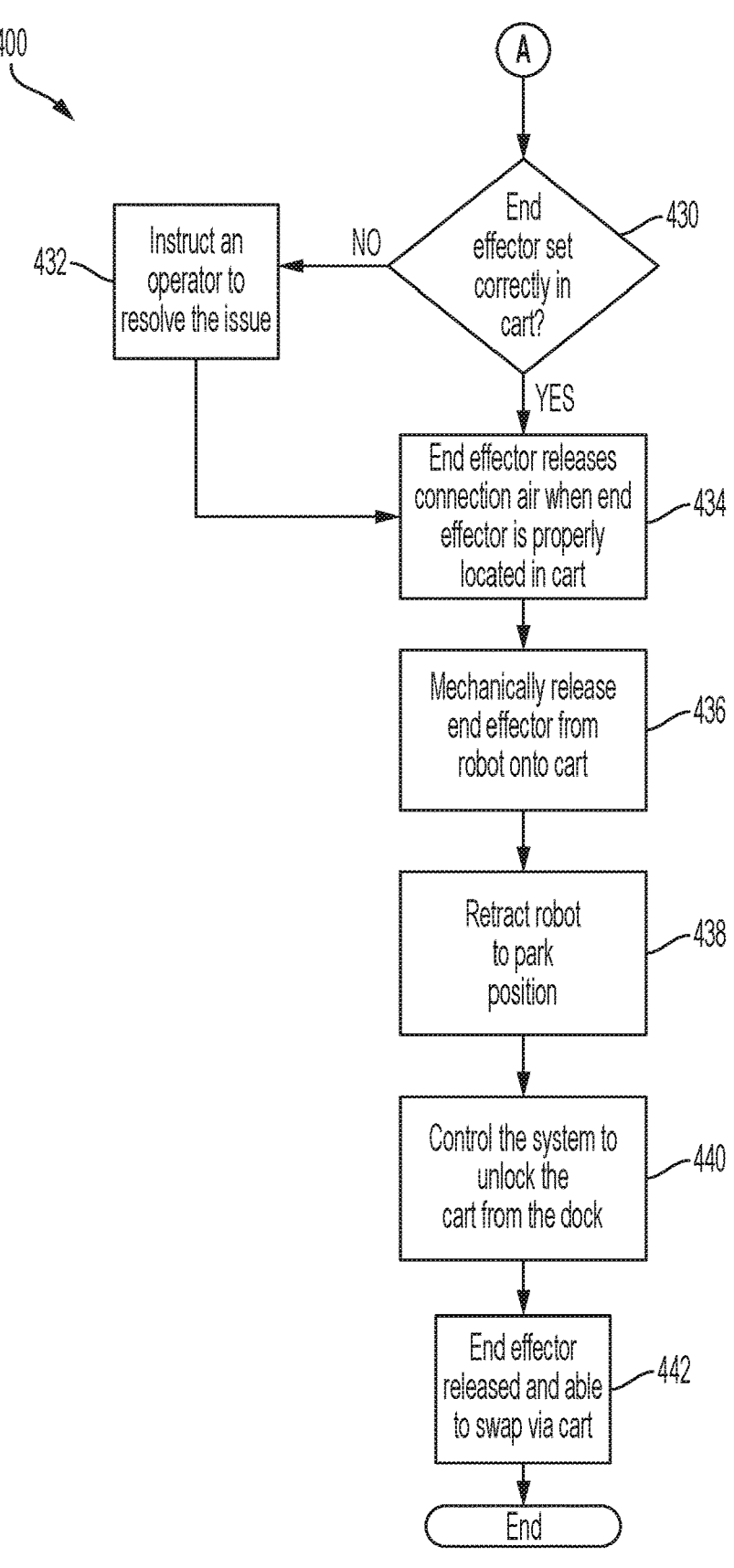

The end effector includes an end effector input/output (I/O) 320, pneumatics control and actuation 322, an end effector control element 324 (e.g., storage) that are each connected with the machine controller 308 to be controlled by the machine controller. The end effector further includes a first end effector component 326 that includes motors, encoders and/or scales. The end effector further includes a second end effector component 328 that includes motors, encoders and/or scales. Similarly, an "N" end effector component 330 includes motors, encoders and/or scales. Thus FIGS. 4A-4B illustrates a method 400 of decommissioning an end effector. The end effector is originally provisioned to a robot. The method 400 is combinable with the example of automation cell 100 (FIG. 1) method 200 (FIG. 2), and/or modular processing system 300 (FIG. 3). In an example, the method 400 is implemented in one or more modules as a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Turning now to FIG. 4A, illustrated processing block 402 includes a command end effector drop off. Illustrated processing block 404 begins moving the robot to swap position. Illustrated processing block 430 determines if the end effector cart is docked in position. If not, illustrated processing block 406 stops robot motion at a wait position. Illustrated processing block 408 issues a message at a human machine interface (HMI) that the cart is not docked, and the robot cannot proceed. Illustrated processing block 416 includes instructing an operator to close the door and/or dock the cart. Illustrated processing block 418 includes receiving a command (e.g., from an operator) to restart. Illustrated processing block 420 includes a robot moving to a swap ready position.

In parallel, illustrated processing block 410 includes a controller (e.g., a controller of a robot, machine controller and/or cell controller) querying the end effector status and parameters. For example, the controller queries the end effector. Illustrated processing block 412 includes recording end effector data (e.g., updates the ID data of the end effector) to an onboard controller (e.g., a control element) of the end effector. Illustrated processing block 414 includes a robot controller shutting down the end effector electrical and air feeds and prepares for disconnection from the robot.

Illustrated processing block 424 determines if the end effector is shutdown and ready to swap. If not, illustrated processing block 422 includes instructing an operator to resolve the issue. Illustrated processing block 426 includes the positioner aligning the end effector to the cart using alignment features. Illustrated processing block 428 includes the positioner placing the end effector into the cart.

Method 400 continues to FIG. 4B. Illustrated processing block 430 determines if the end effector is set correctly in the cart. If not, illustrated processing block 432 instructs an operator to resolve the issue. Illustrated processing block 434 includes an end effector releasing connection air when the end effector is properly located in cart. Illustrated processing block 436 mechanically releases the end effector from the robot onto the cart. Illustrated processing block 438 includes retracting the robot to a park position. Illustrated processing block 440 controls the system to unlock the cart from the dock. Illustrated processing block 442 includes the end effector being released and able to be swapped via the cart. For example, the cart is movable to another robot sot that the end effector is swapped.

Figure 5A:
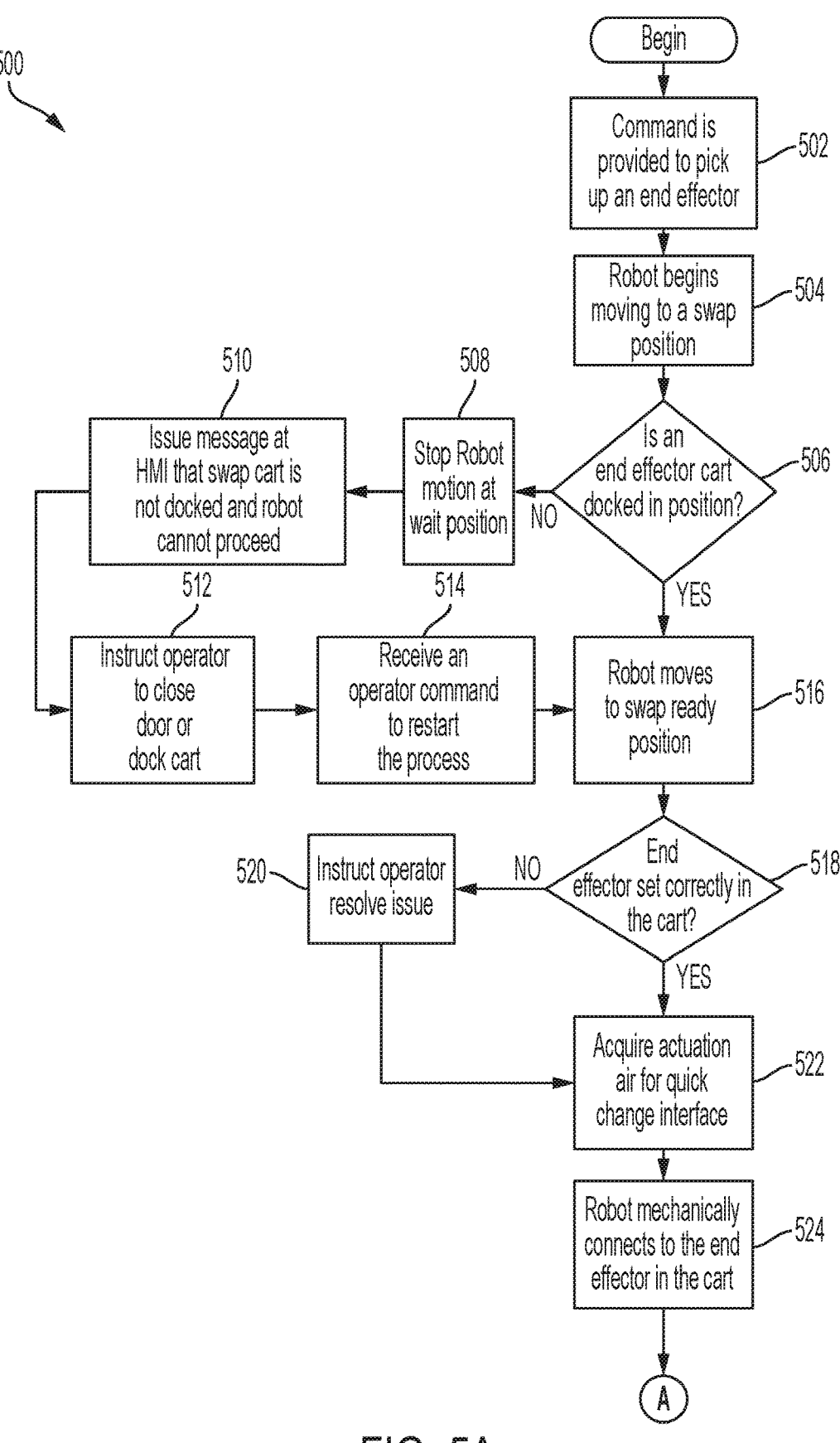
FIGS. 5A and 5B are a flowchart of an example of a method of commissioning an end effector.
Figure 5B:
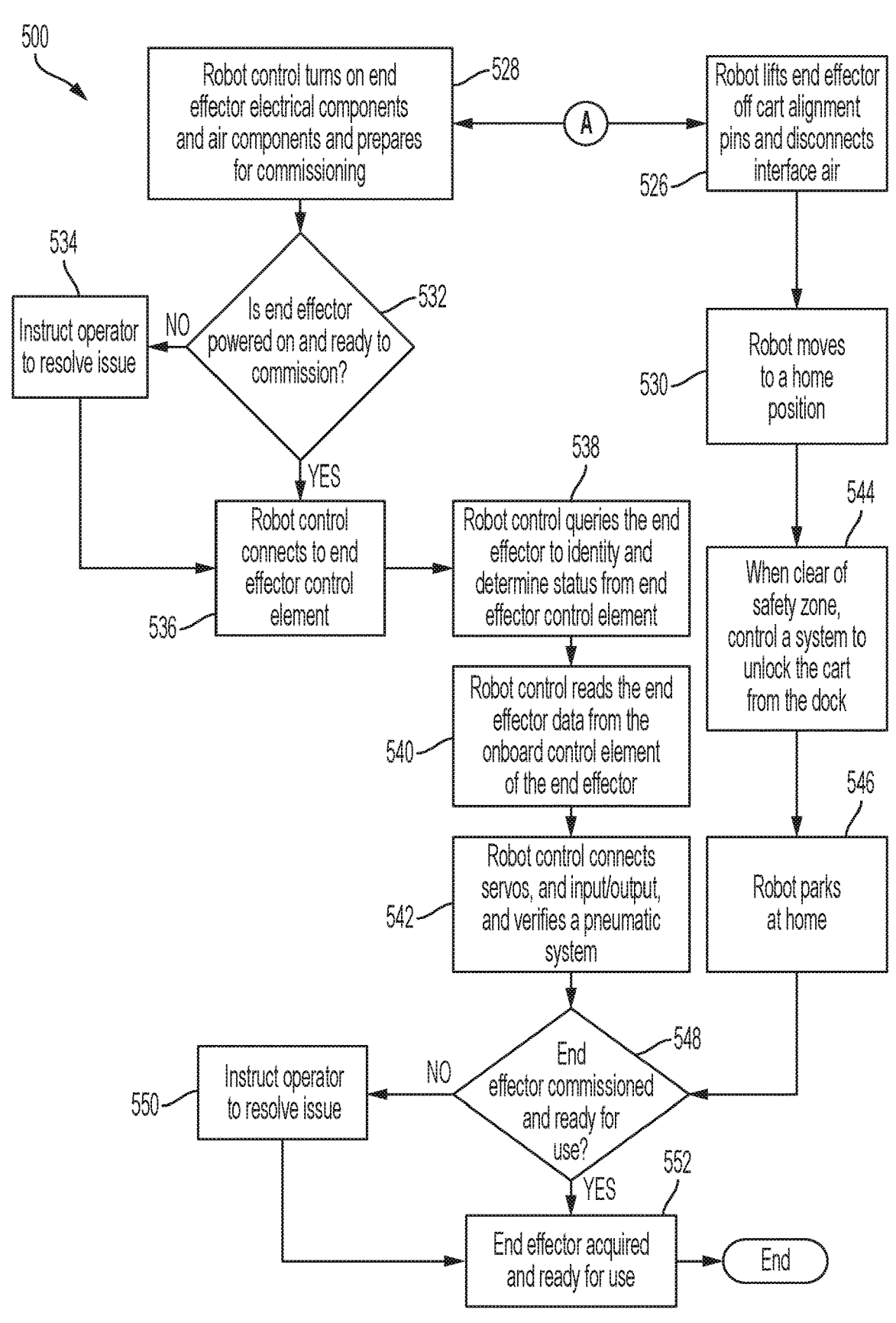

FIGS. 5A-5B illustrates a method 500 of commissioning an end effector. The end effector will be provisioned to a robot. The method 500 is combinable with the example of automation cell 100 (FIG. 1) method 200 (FIG. 2), modular processing system 300 (FIG. 3) and/or method 400 (FIG. 4). In an example, the method 500 is implemented in one or more modules as a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Turning now to FIG. 5A, illustrated processing block 502 includes a command being provided to pick up an end effector. Illustrated processing block 504 includes the robot beginning to move to a swap position. The swap position is where the robot will receive the end effector for provisioning. Illustrated processing block 506 determines if an end effector cart is docked in the swap position. The end effector is on the end effector cart. If not, illustrated processing block 508 stops the robot motion at a wait position to wait for the end effector. Illustrated processing block 510 issues a message at an HMI that swap cart is not docked and the robot cannot proceed. Illustrated processing block 512 instructs an operator to close door or dock cart. Illustrated processing block 514 includes receiving an operator command to restart the process (e.g., after the end effector cart is at the docked position). Illustrated processing block 516 includes a robot moving to a swap ready position. Illustrated processing block 518 determines if the end effector is set correctly in the cart. If not, illustrated processing block 520 includes instructing an operator to resolve the issue. Illustrated processing block 522 acquires actuation air for a quick change interface that will connect to the end effector. Illustrated processing block 524 includes a robot mechanically connecting to the end effector in the cart.

The method 500 continues to FIG. 5B. Illustrated processing block 526 includes the robot lifting the end effector off the cart with alignment pins and disconnects interface the air. Illustrated processing block 530 includes a robot moving to a home position. When clear of a safety zone, illustrated processing block 544 controls a system to unlock the cart from the dock. Illustrated processing block 546 includes the robot parking at home.

In parallel, illustrated processing block 528 includes a robot control turning on the end effector electrical components and air components and prepares for commissioning. Illustrated processing block 532 determines if the end effector is powered on and ready to commission. If not, illustrated processing block 534 instructs an operator to resolve the issue. Illustrated processing block 536 includes the robot control connecting to the end effector control element. Illustrated processing block 538 includes the robot control querying the end effector to identity and determine status from end effector control element. Illustrated processing block 540 includes a robot control reading the end effector data from the onboard control element of the end effector.

Illustrated processing block 542 includes the robot control connecting servos, and input/output (I/O), and verifies a pneumatic system of the end effector. Illustrated processing block 548 determines if the end effector is commissioned and ready for use. If not, illustrated processing block 550 instructs an operator to resolve the issue. Illustrated processing block 552 includes the end effector being acquired (e.g., mounted on robot and functional) and ready for use. The robot uses the end effector and the method 500 ends.

Figure 6:
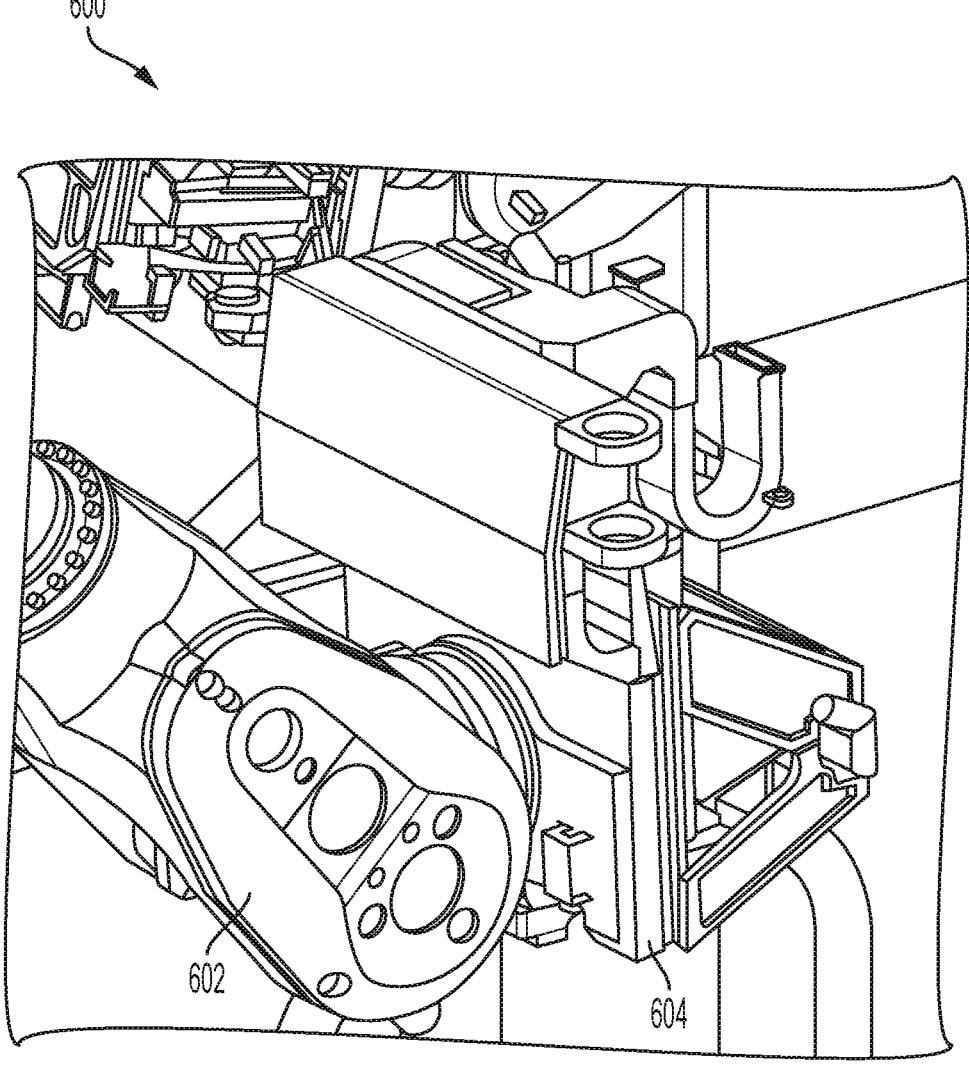
FIG. 6 is an assembly cell according to an example.

FIG. 6 is an example of an assembly cell 600. The cell 600 is combinable with the example of automation cell 100 (FIG. 1), method 200 (FIG. 2), modular processing system 300 (FIG. 3), method 400 (FIG. 4) and/or method 500 (FIGS. 5A-5B). The cell 600 includes an end effector 602 mounted on a robot 604.

Figure 7:
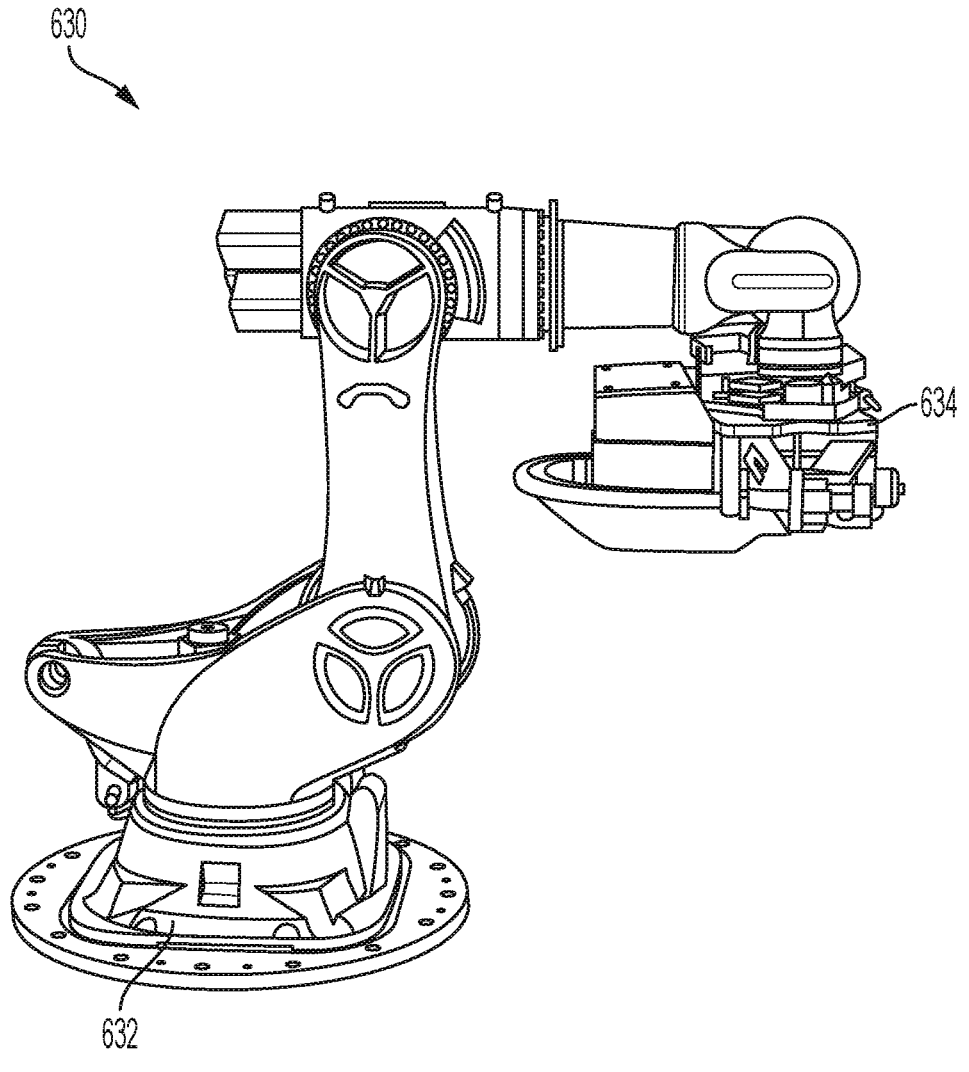
FIG. 7 is a heavy cell according to an example.

FIG. 7 is an example of a heavy cell 630. The heavy cell 630 is combinable combined with the example of automation cell 100 (FIG. 1), method 200 (FIG. 2), modular processing system 300 (FIG. 3), method 400 (FIG. 4), method 500 (FIGS. 5A-5B) and/or assembly cell 600 (FIG. 6). The heavy cell 630 includes a robot 632. The heavy cell 630 includes a custom, multi-function end effector 634.

Figure 8:
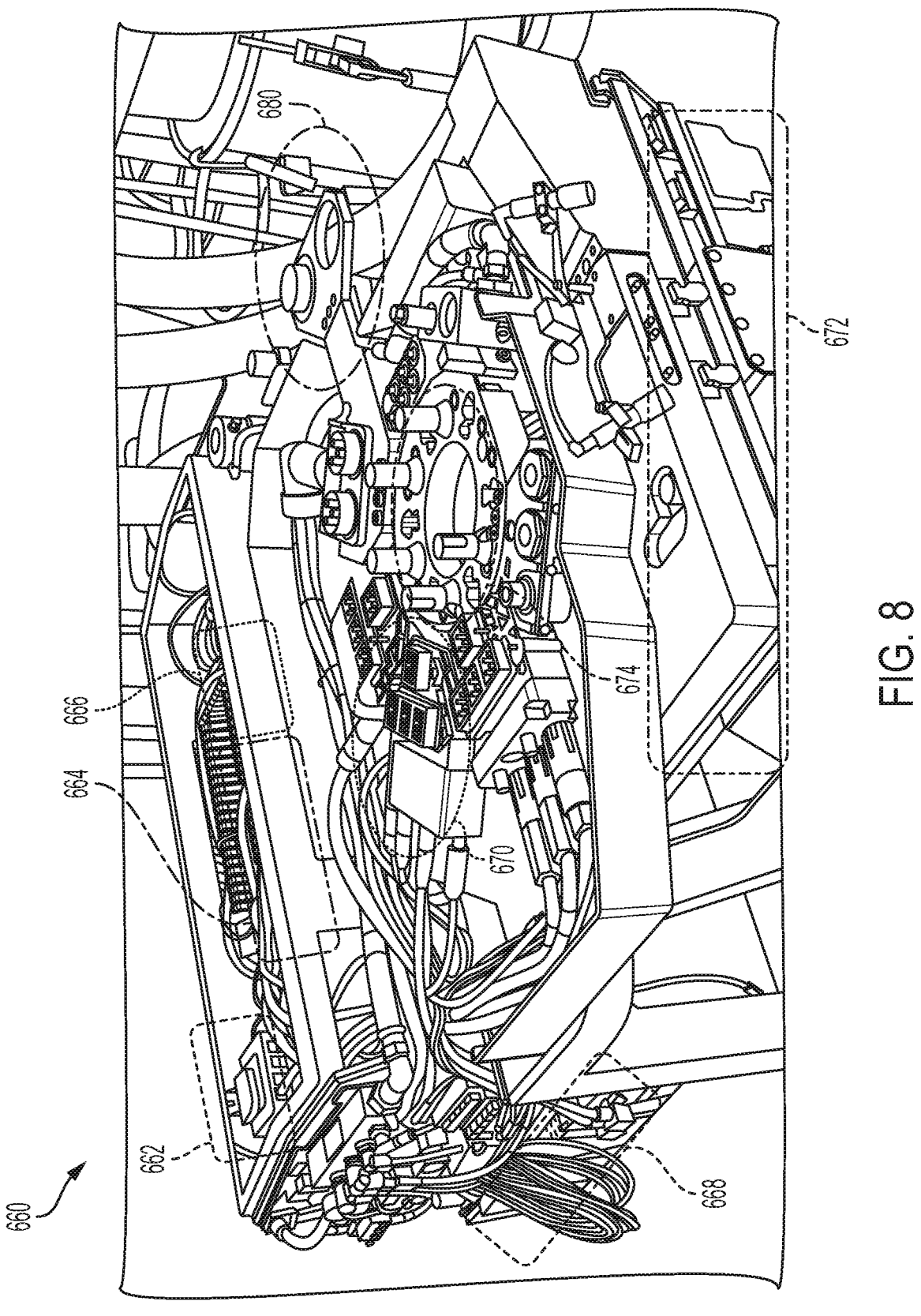
FIG. 8 is a disassembled robot according to an example.

FIG. 8 is a disassembled robot 660. The robot 660 is combinable combined with the example of automation cell 100 (FIG. 1), method 200 (FIG. 2), modular processing system 300 (FIG. 3), method 400 (FIG. 4), method 500 (FIGS. 5A-5B), assembly cell 600 (FIG. 6) and/or a heavy cell 630 (FIG. 7). The robot 660 includes a network communication interface (e.g., an ethernet port) 662. The robot 660 further includes an end effector I/O 664. The robot 660 further includes a controller (e.g., PLC) 666 to control an end effector. The robot 660 further includes an electrical connector 670 and a mechanical interface 674 that couple with and connect to an end effector. The robot 660 further include a process consumables 680 that includes a transport and waste removal connection. The robot 660 further includes pneumatics 668 for moving an end effector. The robot 660 further includes a tool selection and positioning system and process tools 672. The process tools include servo motors, sensors, scales, and actuators, etc.

Figures 9A, 9B:
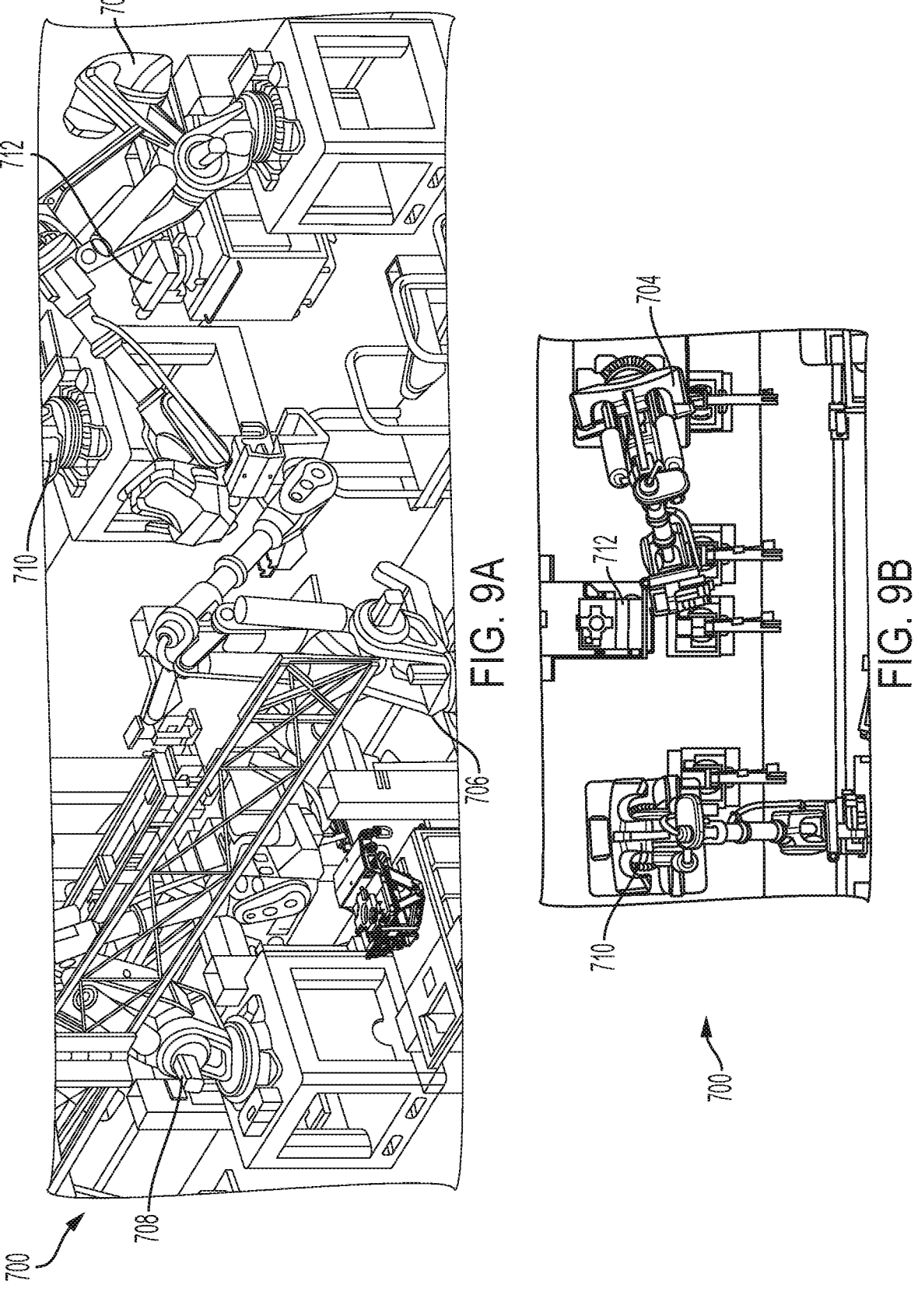
FIGS. 9A, 9B and 9C is an assembly cell according to an example.
Figure 9C:
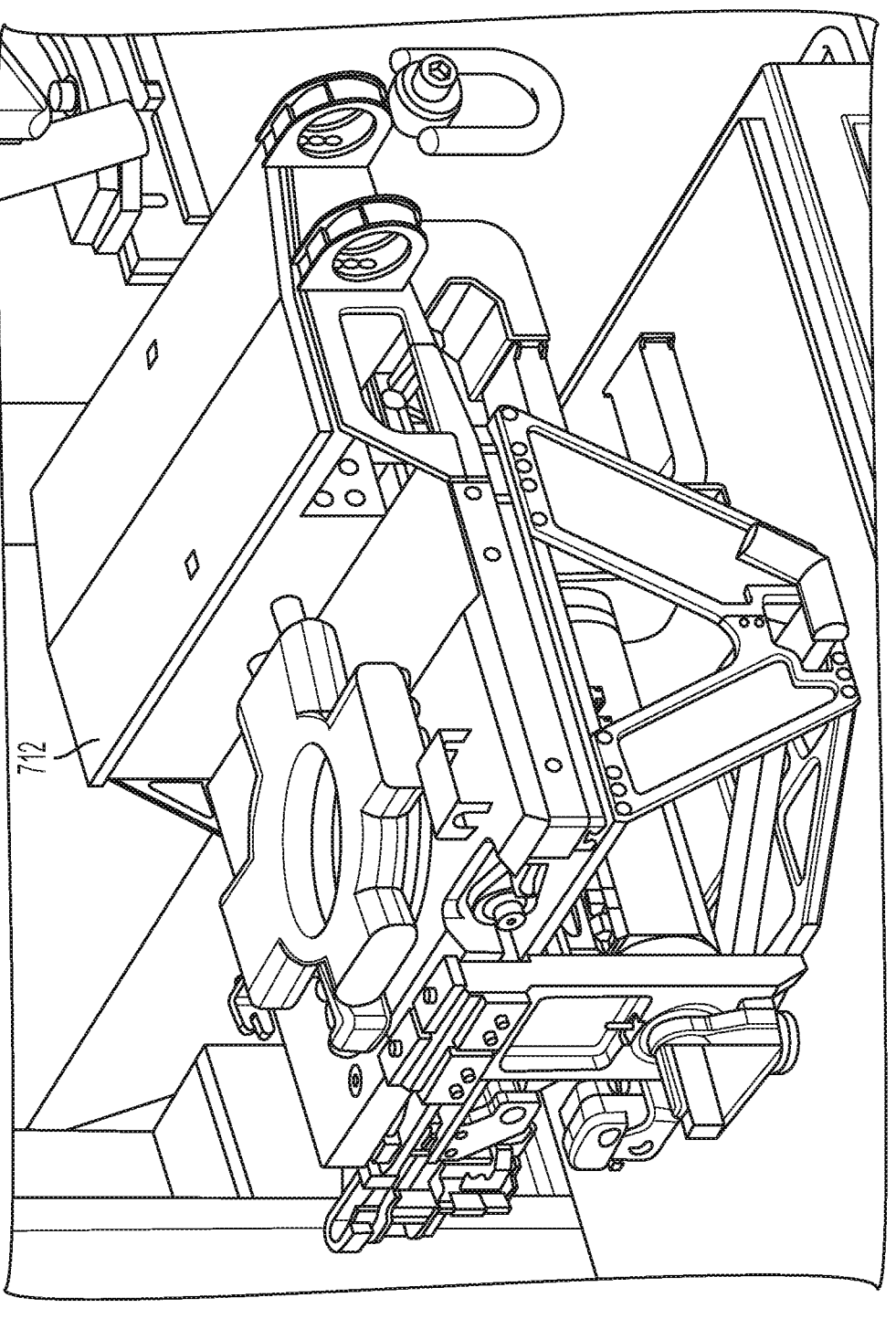

FIGS. 9A-9C illustrate an assembly cell 700. The assembly cell 700 is combinable with the example of automation cell 100 (FIG. 1), method 200 (FIG. 2), modular processing system 300 (FIG. 3), method 400 (FIG. 4), method 500 (FIGS. 5A-5B), assembly cell 600 (FIG. 6), heavy cell 630 (FIG. 7) and/or robot 660 (FIG. 8). In FIGS. 9A-9C, two to four robots 704, 706, 708, 710 are visible (depending on the image) with end effectors attached, and located around an assembly work area. As illustrated in FIG. 9A, spare/additional/different end effectors 712 are illustrated at a storage location. The end effectors 712 are available to be picked up and put to use by robots 704, 706, 708, 710. FIG. 9B illustrates a plan view of the cell 700. End effectors 712 are illustrated in more detail in FIG. 9C. That is, robots 704, 706, 708, 710 share end effectors 712 that are customized for specific pieces of work statement (e.g., drilling versus drilling and fastening or having end effectors for different types of fasteners) and trade them between robots 704, 706, 708, 710 as needed using the common storage locations between the robots 704, 706, 708, 710 and be able to swap them out for regularly scheduled maintenance and repair.

Further, the disclosure comprises additional examples as detailed in the following clauses below.

Clause 1. A modular processing system comprising:

an end effector that includes a storage device, wherein the storage device includes identification data that is specific to the end effector, wherein the identification data includes one or more of at least one setting associated with the end effector or at least one parameter associated with the end effector;

a robot that receives the end effector;

at least one processor; and at least one memory coupled to the at least one processor, the at least one memory including a set of instructions, which when executed by the at least one processor, causes the system to:

identify the identification data of the end effector; and adjust one or more runtime parameters of the system based on the identification data.

Clause 2. The modular processing system of Clause 1, wherein the instructions, when executed, cause the system to:

retrieve the identification data when the end effector is provisioned to the robot.

Clause 3. The modular processing system of Clause 1, wherein the end effector includes:

at least one processor; and at least one memory coupled to the at least one processor of the end effector, the at least one memory of the end effector including a set of instructions, which when executed by the at least one processor of the end effector, causes the end effector to:

identify when the end effector is provisioned to the robot; and present the identification data to the robot.

Clause 4. The modular processing system of Clause 3, wherein the instructions of the end effector, when executed, cause the end effector to:

receive data associated with usage of the end effector by the robot; and record the data in the storage device.

Clause 5. The modular processing system of any one of Clauses 1-4, wherein:

the identification data is associated with one or more of a calibration process or a qualification process of the end effector, and the one or more of the calibration process or the qualification process of the end effector occurs prior to the end effector being received in the robot.

Clause 6. The modular processing system of any one of Clause 5, wherein the instructions, when executed, cause the system to:

access the identification data to bypass conducting at least part of the one or more of the calibration process or the qualification process.

Clause 7. The modular processing system of any one of Clauses 1-6, wherein the identification data includes data identifying hardware components of the end effector.

Clause 8. The modular processing system of any one of Clauses 1-7, wherein:

the identification data includes one or more of weight data of the end effector, a number of sensors of the end effector, one or more types of the sensors of the end effector, a shape of the end effector, a size of the end effector, data associated with a motor of the end effector, or movement data of the end effector; and the storage device is a non-volatile memory.

Clause 9. The modular processing system of any one of Clauses 1-8, wherein the instructions, when executed, cause the system to:

determine that the identification data is to be updated based on an operational condition of the end effector; and instruct the end effector to update the identification data.

Clause 10. An end effector comprising:

at least one processor; and at least one memory coupled to the at least one processor, the at least one memory including a set of instructions, which when executed by the at least one processor, causes the end effector to:

identify when the end effector is provisioned to a robot; and present identification data to the robot, wherein the identification data is specific to the end effector, wherein the identification data includes one or more of at least one setting associated with the end effector or at least one parameter associated with the end effector.

Clause 11. The end effector of Clause 10, wherein the instructions, when executed, cause the end effector to:

identify data associated with usage of the end effector by the robot; and record the data in a storage device.

Clause 12. The end effector of any one of Clauses 10 and 11, wherein:

the identification data is associated with one or more of a calibration process or a qualification process of the end effector, the one or more of the calibration process or the qualification process of the end effector occurs prior to the end effector being received in the robot.

Clause 13. The end effector of Clause 10, wherein the identification data includes data identifying hardware components of the end effector.

Clause 14. The end effector of any one of Clauses 10-13, wherein:

the identification data includes one or more of weight data of the end effector, a number of sensors of the end effector, one or more types of the sensors of the end effector, a shape of the end effector, a size of the end effector, data associated with a motor of the end effector, or movement data of the end effector; and the end effector includes a storage device that is a non-volatile memory, wherein the storage device stores the identification data.

Clause 15. The end effector of any one of Clauses 10-14, wherein the instructions, when executed, cause the end effector to:

update the identification data based on an instruction from the robot.

Clause 16. A robot comprising:

an effector arm to releasably receive an end effector, wherein the end effector stores identification data including one or more of at least one setting associated with the end effector or at least one parameter associated with the end effector;

at least one processor; and at least one memory coupled to the at least one processor, the at least one memory including a set of instructions, which when executed by the at least one processor, causes the robot to:

identify the identification data of the end effector; and adjust one or more runtime parameters of the robot based on the identification data.

Clause 17. The robot of Clause 16, wherein the instructions, when executed, cause the robot to:

retrieve the identification data when the end effector is provisioned to the robot.

Clause 18. The robot of Clause 17, wherein:

the identification data is associated with one or more of a calibration process or a qualification process of the end effector, the one or more of the calibration process or the qualification process of the end effector occurs prior to the end effector being received in robot.

Clause 19. The robot of Clause 18, wherein the instructions, when executed, cause the robot to:

access the identification data to bypass conducting at least part of the one or more of the calibration process or the qualification process.

Clause 20. The robot of any one of Clauses 16-19, wherein the identification data includes data identifying hardware components of the end effector.

Clause 21. The robot of any one of Clauses 16-20, wherein:

the identification data includes one or more of weight data of the end effector, a number of sensors of the end effector, one or more types of the sensors of the end effector, a shape of the end effector, a size of the end effector, data associated with a motor of the end effector, or movement data of the end effector.

Clause 22. The robot of any one of Clauses 16-21, wherein the instructions, when executed, cause the robot to:

determine that the identification data is to be updated based on an operational condition of the end effector; and instruct the end effector to update the identification data.

Clause 23. A method comprising:

identifying that an end effector is provisioned to a robot;

accessing identification data of the end effector, wherein the identification data is specific to the end effector, wherein the identification data includes one or more of at least one setting associated with the end effector or at least one parameter associated with the end effector; and controlling the end effector based on the identification data to adjust one or more runtime parameters of the robot based on the identification data.

Clause 24. The method of Clause 23, further comprising retrieving the identification data when the end effector is provisioned to the robot.

Clause 25. The method of any one of Clauses 23 and 24, further comprising:

identifying, with the end effector, when the end effector is provisioned to the robot; and presenting, with the end effector, the identification data to the robot.

Clause 26. The method of Clause 25, further comprising:

identifying end effector data associated with usage of the end effector by the robot; and recording the data in a storage device of the end effector.

Clause 27. The method of any one of Clauses 23-26, wherein:

the identification data is associated with one or more of a calibration process or a qualification process of the end effector, the one or more of the calibration process or the qualification process of the end effector occurs prior to the end effector being received in the robot.

Clause 28. The method of Clause 27, further comprising:

accessing the identification data to bypass conducting at least part of the one or more of the calibration process or the qualification process.

Clause 29. The method of any one of Clauses 23-28, wherein the identification data includes data identifying hardware components of the end effector.

Clause 30. The method of any one of Clauses 23-29, wherein the identification data includes one or more of weight data of the end effector, a number of sensors of the end effector, one or more types of the sensors of the end effector, a shape of the end effector, a size of the end effector, data associated with a motor of the end effector, or movement data of the end effector.

Examples are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some can be different, to indicate more constituent signal paths, have a number label, to indicate a number of constituent signal paths, and/or have arrows at one or more ends, to indicate primary information flow direction. This, however, should not be construed in a limiting manner. Rather, such added detail can be used in connection with one or more exemplary examples to facilitate easier understanding of a circuit. Any represented signal lines, whether or not having additional information, can actually comprise one or more signals that can travel in multiple directions and can be implemented with any suitable type of signal scheme, e.g., digital or analog lines implemented with differential pairs, optical fiber lines, and/or single-ended lines.

Example sizes/models/values/ranges can have been given, although examples are not limited to the same. Further, arrangements can be shown in block diagram form in order to avoid obscuring examples, and also in view of the fact that specifics with respect to implementation of such block diagram arrangements are highly dependent upon the computing system within which the example is to be implemented, i.e., such specifics should be well within purview of one skilled in the art. Where specific details (e.g., circuits) are set forth in order to describe example examples, it should be apparent to one skilled in the art that examples can be practiced without, or with variation of, these specific details. The description is thus to be regarded as illustrative instead of limiting.

The term "coupled" can be used herein to refer to any type of relationship, direct or indirect, between the components in question, and can apply to electrical, mechanical, fluid, optical, electromagnetic, electromechanical or other connections. In addition, the terms "first", "second", etc. can be used herein only to facilitate discussion, and carry no particular temporal or chronological significance unless otherwise indicated. To the extent that terms "includes," "including," "has," "contains," and variants thereof are used herein, such terms are intended to be inclusive in a manner similar to the term "comprises" as an open transition word without precluding any additional or other elements.

As used in this application and in the claims, a list of items joined by the term "one or more of" can mean any combination of the listed terms. For example, the phrases "one or more of A, B or C" can mean A; B; C; A and B; A and C; B and C; or A, B and C.

Those skilled in the art will appreciate from the foregoing description that the broad techniques of the examples can be implemented in a variety of forms. Therefore, while the examples have been described in connection with particular examples thereof, the true scope of the examples should not be so limited since other modifications will become apparent to the skilled practitioner upon a study of the drawings, specification, and following claims.

We claim:

1. A modular processing system comprising:

an end effector that includes a storage device, wherein the storage device includes identification data that is specific to the end effector, and wherein the identification data includes:

a plurality of joint-specific calibration offsets associated with the end effector, the offsets being determined during an offline calibration process prior to the end effector being received by a robot, wherein the offline calibration process includes measuring physical characteristics of the end effector to determine actual movement distances of the end effector in response to movement commands, and wherein the joint- specific calibration offsets include the actual movement distances that are precomputed prior to the end effector being received by the robot; and historical usage data associated with the end effector, the historical usage data representing operational history and changes in operational condition of the end effector, wherein the changes in operational condition include one or more hardware changes in the end effector that affect performance of the end effector;

the robot that receives the end effector;

at least one processor; and at least one memory coupled to the at least one processor, the at least one memory including a set of instructions, which when executed by the at least one processor, causes the system to:

identify the identification data of the end effector upon the end effector being received by the robot; and self-adjust one or more runtime parameters of the system based on the identification data, thereby bypassing a calibration process and configuring the system for immediate operation, wherein the system is configured for operation without performing the calibration process after the end effector is received by the robot.

2. The modular processing system of claim 1, wherein:

the joint-specific calibration offsets include correlations between a vision system of the robot and a tool center point of the end effector, the correlations accounting for tolerance build-up due to mechanical component variations in the end effector; and the instructions, when executed, cause the system to:

automatically retrieve and apply the identification data in response to the end effector being provisioned to the robot; and shift a coordinate system based on the correlations to track the tool center point of the end effector.

3. The modular processing system of claim 1, wherein the end effector includes:

at least one processor; and at least one memory coupled to the at least one processor of the end effector, the at least one memory of the end effector including a set of instructions, which when executed by the at least one processor of the end effector, causes the end effector to:

identify when the end effector is provisioned to the robot; and present the identification data to the robot.

4. The modular processing system of claim 3, wherein the instructions of the end effector, when executed, cause the end effector to:

receive the historical usage data associated with usage of the end effector by the robot; and record the historical usage data in the storage device.

5. The modular processing system of claim 1, wherein:

the identification data is associated with the calibration process and a qualification process of the end effector;

the calibration process and the qualification process of the end effector occurs prior to the end effector being received in the robot; and the calibration process includes measuring the physical characteristics of the end effector offline.

6. The modular processing system of claim 5, wherein the instructions, when executed, cause the system to:

automatically access the identification data to bypass conducting the calibration process and the qualification process.

7. The modular processing system of claim 1, wherein the identification data includes data identifying hardware components of the end effector.

8. The modular processing system of claim 1, wherein:

the identification data includes the weight data of the end effector, the number of sensors of the end effector, the one or more types of the sensors of the end effector, a shape of the end effector, a size of the end effector, data associated with a motor of the end effector, and movement data of the end effector;

the movement data includes the actual movement distances of the end effector in response to movement commands, the actual movement distances representing deviations from commanded movement distances; and the storage device is a non-volatile memory.

9. The modular processing system of claim 1, wherein the instructions, when executed, cause the system to:

determine that the identification data is to be updated based on an operational condition of the end effector; and instruct the end effector to update the identification data.

10. An end effector comprising:

at least one processor; and at least one memory coupled to the at least one processor, the at least one memory including a set of instructions, which when executed by the at least one processor, causes the end effector to:

identify when the end effector is provisioned to a robot; and present identification data to the robot, wherein the identification data is specific to the end effector, wherein the identification data includes:

a plurality of joint-specific calibration offsets associated with the end effector, the offsets being determined during an offline calibration process prior to the end effector being received by a robot, wherein the offline calibration process includes measuring physical characteristics of the end effector to determine actual movement distances of the end effector in response to movement commands, and wherein the joint- specific calibration offsets include the actual movement distances that are precomputed prior to the end effector being received by the robot; and historical usage data associated with the end effector, the historical usage data representing operational history and changes in operational condition of the end effector, wherein the changes in operational condition include one or more hardware changes in the end effector that affect performance of the end effector; and self-adjust one or more runtime parameters of the robot based on the identification data, thereby bypassing a calibration process and configuring the robot for immediate operation, wherein the robot is configured for operation without performing the calibration process after the end effector is received by the robot.

11. The end effector of claim 10, wherein the instructions, when executed, cause the end effector to:

identify the historical usage data associated with usage of the end effector by the robot; and record the historical usage data in a storage device.

12. The end effector of claim 10, wherein:

the identification data is associated with the calibration process and a qualification process of the end effector, the calibration process and the qualification process of the end effector occurs prior to the end effector being received in the robot.

13. The end effector of claim 10, wherein the identification data includes data identifying hardware components of the end effector.

14. The end effector of claim 10, wherein:

the identification data includes the one or more of weight data of the end effector, the number of sensors of the end effector, the one or more types of the sensors of the end effector, a shape of the end effector, a size of the end effector, data associated with a motor of the end effector, and movement data of the end effector; and the end effector includes a storage device that is a non-volatile memory, wherein the storage device stores the identification data.

15. The end effector of claim 10, wherein the instructions, when executed, cause the end effector to:

update the identification data based on an instruction from the robot.

16. A robot comprising:

an effector arm to releasably receive an end effector, wherein the end effector stores identification data including:

a plurality of joint-specific calibration offsets associated with the end effector, the offsets being determined during an offline calibration process prior to the end effector being received by the robot, wherein the offline calibration process includes measuring physical characteristics of the end effector to determine actual movement distances of the end effector in response to movement commands, and wherein the joint-specific calibration offsets include the actual movement distances that are precomputed prior to the end effector being received by the robot; and historical usage data associated with the end effector, the historical usage data representing operational history and changes in operational condition of the end effector, wherein the changes in operational condition include one or more hardware changes in the end effector that affect performance of the end effector;

at least one processor; and at least one memory coupled to the at least one processor, the at least one memory including a set of instructions, which when executed by the at least one processor, causes the robot to:

identify the identification data of the end effector upon the end effector being received by the robot; and self-adjust one or more runtime parameters of the robot based on the identification data, thereby bypassing a calibration process and configuring the robot for immediate operation, wherein the robot is configured for operation without performing the calibration process after the end effector is received by the robot.

17. The robot of claim 16, wherein the instructions, when executed, cause the robot to:

automatically retrieve and apply the identification data in response to the end effector being provisioned to the robot.

18. The robot of claim 17, wherein:

the identification data is associated with the calibration process and a qualification process of the end effector, the calibration process and the qualification process of the end effector occurs prior to the end effector being received in robot.

19. The robot of claim 18, wherein the instructions, when executed, cause the robot to:

automatically access the identification data to bypass conducting the calibration process and the qualification process.

20. The robot of claim 16, wherein the identification data includes data identifying hardware components of the end effector, and further wherein the identification data includes the weight data of the end effector, the number of sensors of the end effector, the one or more types of the sensors of the end effector, a shape of the end effector, a size of the end effector, data associated with a motor of the end effector, and movement data of the end effector, wherein the instructions, when executed, cause the robot to:

determine that the identification data is to be updated based on an operational condition of the end effector; and instruct the end effector to update the identification data.

* * * * *